United States Patent
Lerman

(10) Patent No.: US 9,110,852 B1
(45) Date of Patent: Aug. 18, 2015

(54) METHODS AND SYSTEMS FOR EXTRACTING INFORMATION FROM TEXT

(75) Inventor: Kevin Lerman, New York, NY (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 13/554,427

(22) Filed: Jul. 20, 2012

(51) Int. Cl.
*G06F 17/15* (2006.01)

(52) U.S. Cl.
CPC ..................... *G06F 17/15* (2013.01)

(58) Field of Classification Search
CPC .............................. G10L 15/183; G06F 17/15
USPC ............................................................ 704/9
See application file for complete search history.

(56) References Cited

U.S. PATENT DOCUMENTS

| | | | |
|---|---|---|---|
| 4,759,068 A * | 7/1988 | Bahl et al. | 704/242 |
| 5,666,502 A | 9/1997 | Capps | |
| 5,946,647 A | 8/1999 | Miller et al. | |
| 5,970,449 A * | 10/1999 | Alleva et al. | 704/235 |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,562,076 B2 | 7/2009 | Kapur | |
| 7,565,139 B2 | 7/2009 | Neven, Sr. et al. | |
| 7,581,170 B2 * | 8/2009 | Baumgartner et al. | 715/234 |
| 7,761,414 B2 | 7/2010 | Freedman | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 8,005,720 B2 | 8/2011 | King et al. | |
| 8,086,604 B2 | 12/2011 | Arrouye et al. | |
| 8,286,885 B1 | 10/2012 | Zehr et al. | |
| 8,316,029 B2 | 11/2012 | Lawrence | |
| 2002/0083039 A1 | 6/2002 | Ferrari et al. | |
| 2004/0093321 A1 | 5/2004 | Roustant et al. | |
| 2006/0026147 A1 | 2/2006 | Cone et al. | |
| 2007/0260594 A1 | 11/2007 | Lewak et al. | |
| 2008/0010273 A1 | 1/2008 | Frank | |
| 2008/0126143 A1 | 5/2008 | Altman et al. | |
| 2009/0224867 A1 | 9/2009 | O'Shaughnessy et al. | |
| 2010/0070448 A1 | 3/2010 | Omoigui | |
| 2011/0137883 A1 | 6/2011 | Lagad et al. | |

(Continued)

FOREIGN PATENT DOCUMENTS

| | | |
|---|---|---|
| CN | 101341464 A | 1/2009 |
| WO | WO 0131479 | 5/2001 |
| WO | WO 2006110480 | 10/2006 |
| WO | WO 2010120925 | 10/2010 |

OTHER PUBLICATIONS

Dekang Lin, "Dependency-based Evaluation of MINIPAR," In Workshop on the Evaluation of Parsing Systems, May 1998, 14 pages, Granada, Spain.

(Continued)

*Primary Examiner* — Susan McFadden
(74) *Attorney, Agent, or Firm* — Finnegan, Henderson, Farabow, Garrett & Dunner, L.L.P.

(57) ABSTRACT

Information may be extracted from a text corpus. The text corpus may be parsed into a parse tree structure based on the parts of speech of the words of the text corpus. A path in the parse tree structure may be identified as linking an entity and a value, and the path may be applied to the same or other text corpuses to extract other instances of entity-value pairs. Extracted information, associated paths, or both may be validated in some instances.

35 Claims, 10 Drawing Sheets

(56) References Cited

U.S. PATENT DOCUMENTS

| | | | |
|---|---|---|---|
| 2011/0184981 | A1 | 7/2011 | Lu et al. |
| 2011/0202493 | A1 | 8/2011 | Li |
| 2012/0101858 | A1 | 4/2012 | Depasquale et al. |
| 2012/0101901 | A1 | 4/2012 | Depasquale et al. |
| 2012/0150572 | A1 | 6/2012 | Fredericks et al. |
| 2012/0246153 | A1 | 9/2012 | Pehle |
| 2012/0330906 | A1 | 12/2012 | Fredericks et al. |
| 2013/0054542 | A1 | 2/2013 | Ollenberger et al. |
| 2013/0110833 | A1 | 5/2013 | Fredericks et al. |

OTHER PUBLICATIONS

Marie-Catherine De Marneffe, Christopher D. Manning, "Stanford Typed Dependencies Manual," Sep. 2011, 24 pages.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," Apr. 13, 2010, 14 pages.

Kao, Wayne, "Telling the Story of Friendships," Facebook, Oct. 28, 2010, available at http://blog.facebook.com/blog.php?post=443390892130, pp. 1-2.

Tripit, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

* cited by examiner

METHODS AND SYSTEMS FOR EXTRACTING INFORMATION FROM TEXT

The present disclosure relates to extracting information from text, and more particularly relates to extracting parse tree paths and facts from text.

BACKGROUND

Text may be available from many sources such as websites and databases. Data mining techniques are generally directed to extracting facts, relationships between words, or other information from text. Conventional techniques for extracting facts from a text corpus typically involve analyzing text and identifying words or phrases in sentence strings. A text corpus such as a sentence or paragraph is typically parsed based on the presence of particular words or strings of words. Natural language can be difficult to parse and analyze robustly due to its sometimes nonlinear form. Accordingly, extraction of facts from natural language may present challenges for extraction tools that operate on sentence strings.

SUMMARY

Systems and methods are provided for determining information from text.

In some implementations, a text corpus, which may include multiple words, may be parsed into a corresponding parse tree structure based on the parts of speech of the words. A plurality of entity-value pairs may be identified in the text corpus, and may correspond to a predetermined entity and a predetermined value related to the predetermined entity. A plurality of parse tree paths corresponding to the plurality of entity-value pairs may be extracted. Information based on at least one of the plurality of parse tree paths may be determined.

In some implementations, a system may include processing equipment configured to parse a text corpus, which may include multiple words, into a corresponding parse tree structure based on the parts of speech of the words. The processing equipment may also be configured to identify a plurality of entity-value pairs in the text corpus, which may correspond to a predetermined entity and a predetermined value related to the predetermined entity. The processing equipment may also be configured to extract a plurality of parse tree paths corresponding to the plurality of entity-value pairs. The processing equipment may also be configured to determine information based on at least one of the plurality of parse tree paths.

In some implementations, a text corpus, which may include multiple words, may be parsed into a corresponding parse tree structure based on the parts of speech of the words. It may be determined whether the parse tree structure includes a predetermined parse tree path. A portion of the text corpus corresponding to the predetermined parse tree path may be identified when the parse tree structure includes the predetermined parse tree path. An entity-value pair may be extracted from the portion of the text corpus.

In some implementations, a system may include processing equipment configured to parse a text corpus, which may include multiple words, into a corresponding parse tree structure based on the parts of speech of the words. The processing equipment may also be configured to determine whether the parse tree structure includes a predetermined parse tree path. The processing equipment may also be configured to identify a portion of the text corpus corresponding to the predetermined parse tree path when the parse tree structure includes the predetermined parse tree path. The processing equipment may also be configured to extract an entity-value pair from the portion of the text corpus.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

The present disclosure is directed towards extracting information, such as parse tree paths and facts, from available textual data. Facts may be extracted in the form of entity-attribute-value (EAV) relationships. The term fact will be used herein interchangeably with EAV. An entity and a value may each be a topic, a concept, a measurement, or anything else for which a relationship may be identified. Facts can include explicit information on the link between an entity and a value. Fact extraction may be particularly desirable when large amounts of information are available, and concise entity-value relationships are desired. For example, as text is increasingly generated and stored, the extraction of facts may allow relevant information to be gathered for present and future reference without repeatedly parsing the text as facts are desired. For example, an entity and a value may each be a person, place, or thing, relatable by some suitable attribute. To illustrate, an example of a suitable EAV may include Person-School-School Name, indicating which school, the attribute, that a particular person, the entity, had attended by identifying the school name, the value. The disclosed techniques for extracting facts in the form of EAVs may be applied to a corpus of text, which may be supplied from a specific repository of articles, a database, a selection of pages from the Internet, user input, any other suitable source of text, any suitable stored data structure representation, or any combination thereof. In some implementations, one or more data structure representations containing examples of relations to be extracted may be available, generated, or both. An example EAV from this example data structure representation may be considered, and the entity-value pair, having a known attribute, may be searched for in a text corpus. If the entity-value pair is located in the text corpus, a parse tree of the corresponding text, e.g., the sentence including the entity-value pair, may be generated, and a path of the parse tree linking the entity and value may be extracted. Because the entity and value are related by a particular attribute, the extracted path may be considered to correspond to that attribute. Extracted paths may be stored in a data structure representation, and used to extract new facts from text. The new facts may be the same or different than the example facts.

Figure 1:
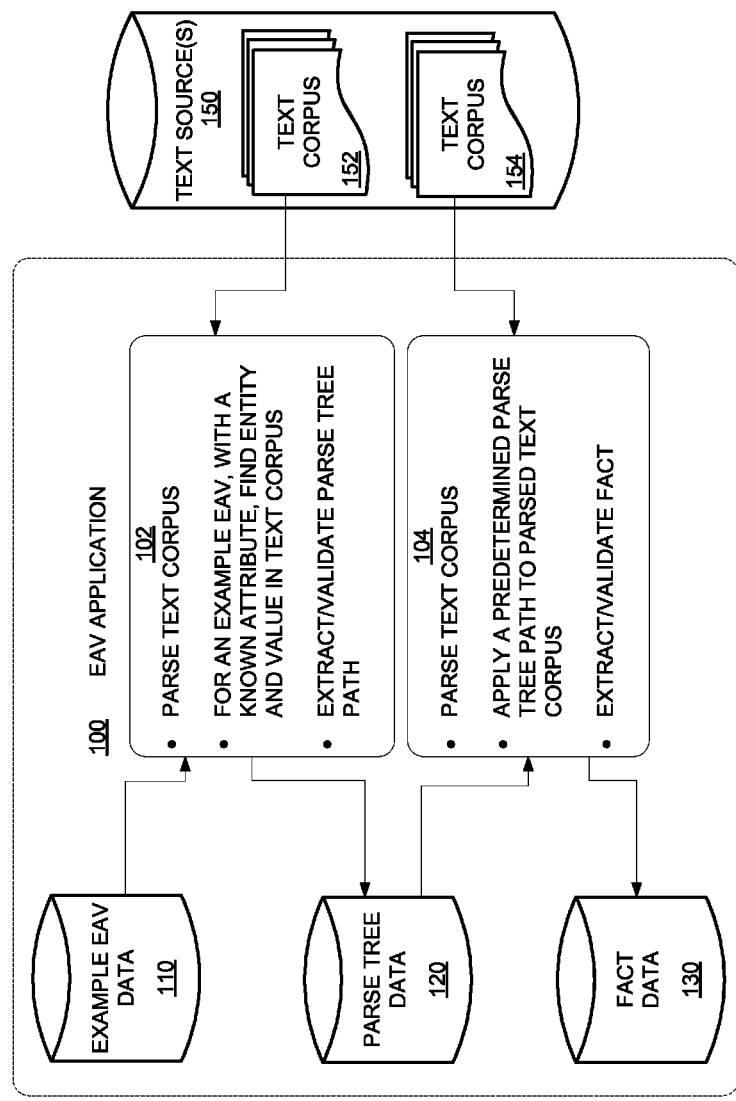
FIG. 1 is a block diagram of an illustrative implementation of an entity-attribute-value (EAV) application.

FIG. 1 is a block diagram of an illustrative implementation of an entity-attribute-value (EAV) application 100, in accordance with some implementations of the present disclosure. In some implementations, EAV application 100 may be used to parse text corpus 152 from one or more text sources 150, identify an entity and a value in the parsed text, and determine and validate a representative tree path based on the parsing, as shown by module 102. Text sources 150 may include, for example, web pages, web documents, data structure representations storing text, electronic texts such as scanned books, any other suitable text source, or any combination thereof. For example, text sources 150 may include text rendered in hypertext markup language (html), which may be available on a webpage. In general, some example or seed facts, from example EAV data 110, which may be stored in any suitable data structure representation, may be used for each desired type of relation. Each example EAV may include a predetermined entity and a predetermined value, related by a predetermined attribute. EAV application 100 may parse the text corpus 152 into a parse tree structure. A parse tree structure represents a linking between the words of a text corpus based on their grammatical connections. EAV application 100 may validate and store the extracted tree paths in parse tree data 120.

In some implementations, EAV application 100 may use extracted tree paths from parse tree data 120, e.g., extracted using the example facts, to extract new facts, e.g., new "height" facts or new "country capital" facts, from text corpus 154, as shown by module 104. Parse tree data 120 may be stored in any suitable data structure representation. EAV application 100 may validate and then store the extracted facts in fact data 130, which may be stored in any suitable data structure representation. In some implementations, EAV application 100 may use one or more predetermined tree paths from parse tree data 120 to extract entity-value pairs from text. For example, "USA" could be an entity, "country capital" could be an attribute, and "Washington D.C." could be a value, with the fact being that Washington D.C. is the capital of the country USA.

In an illustrative example, facts regarding the country-capital relation may be extracted based on several exemplary country-capital relations stored in example EAV data 110, such as "USA-Washington D.C." and "Russia-Moscow." The following text corpus: "The capital of Cuba is Havana" may be analyzed, and the entity-value pair "Cuba-Havana" may be extracted by module 104. The extraction may be based on the word "capital," the organization of the sentence, e.g., as determined by parsing the words of the sentence by part of speech, a predetermined parse tree path from parse tree data 120, the presence of proper nouns such as a country name and a city name, any other suitable criteria, or any combination thereof. In some implementations, more than one type of relation or domain of relations may be extracted. For example, module 104 may be configured to extract facts about multiple relations, such as "country-capital," "country-population," and "movie-director" relations. In some implementations, relations can relate entities to numbers or other values that may be, but need not be, entities themselves. For example, the "entity-height" relation may relate people to measurements such as numbers and/or units of measure, which are not necessarily entities themselves.

The features and techniques of the present disclosure may be implemented in whole or in part by an EAV application. For clarity and brevity, and not by way of limitation, the present disclosure refers to the EAV application as implementing these features and techniques. The EAV application may be any suitable software, hardware, or both. The EAV application may be implemented as a single module in a single device, as multiple modules in a single device, or as one or more distributed modules across multiple devices such as, for example, in a distributed processing/storage arrangement such as in a network.

Figure 2:
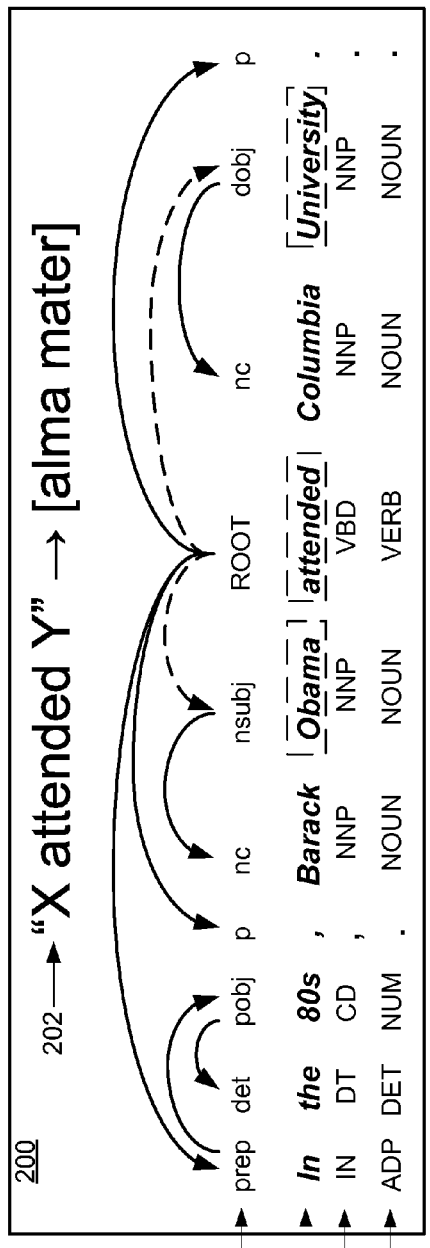
FIG. 2 is a diagram of an illustrative parsed text corpus.
Figure 3:
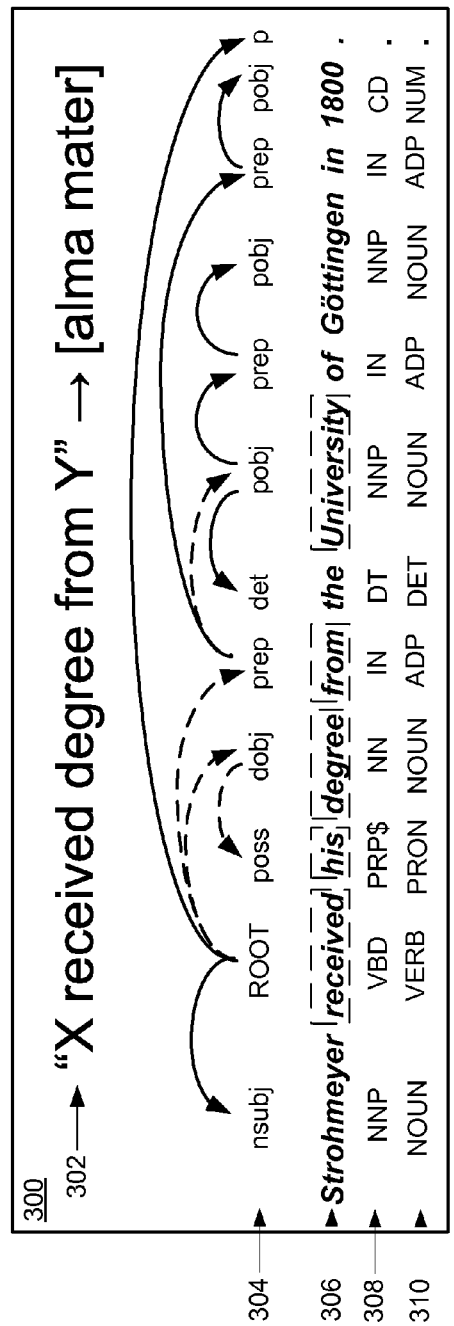
FIG. 3 is a diagram of a further illustrative parsed text corpus.

FIGS. 2-3 illustrate some examples of extracting EAV relationships from a text corpus, in accordance with some implementations of the present disclosure. The parsing shown in FIGS. 2-3 may be performed, for example, by an EAV application implemented using modules 102 and 104 of FIG. 1. The EAV application can be implemented using one or more processing devices such as servers, one or more client devices such as smartphones, or any combination thereof.

FIG. 2 is a diagram 200 of an illustrative parsed text corpus 206, in accordance with some implementations of the present disclosure. Sentence 206, as shown below:

In the 80s, Barack Obama attended Columbia University. is an exemplary relation between "Barack Obama" and "Columbia University," having the attribute "alma mater." Row 210 shows the respective parts of speech of text corpus 206, such as NOUN, VERB, determiner (DET), number (NUM), and preposition (ADP). Row 208 shows illustrative tags, using a first illustrative tag set, for respective parts of speech of text corpus 206, such as preposition (IN), proper noun (NNP), past tense verb (VBD), determiner (DT), and cardinal number (CD). Row 204 shows illustrative tags, using a second illustrative tag set, for respective semantic role labels of text corpus 206, e.g., indicating how each word relates to its parent in the parse tree, such as preposition (prep), determiner (det), verb (ROOT), punctuation (p), compound modifier (nc), nominal subject (nsubj), direct object of a verb (dobj), and object of a preposition (pobj). Referencing the ROOT, which may also be referred to as a main verb, of text corpus 206 as shown in row 204, a parse tree may be generated, as shown by the curved arrows. In some circumstances, a main verb serves as a convenient reference within a text corpus, indicating an action corresponding to a relationship between entities. For example, a main verb can describe the link between a subject and a direct object respectively representing the entity and value. It will be understood that other parts of speech may be used as a reference to generate a parse tree. The parse tree represents a particular organization of the words of text corpus 206, and may be used to indicate the textual relation between an entity and a value. In some implementations, an EAV application may use a predetermined entity and value, and parse a text corpus to determine a parse tree path linking the entity and value. In some implementations, an EAV application may use a predetermined parse tree path, e.g., as at least a part of parse tree data 120 of FIG. 1, and extract an entity-value pair from a text corpus. Illustrative text pattern 202 is representative of the portion of the tree path corresponding to the ""alma mater" attribute. The parse tree path may include the words themselves, parts of speech, semantic role labels, relationships to parent words, relationships to child words, any other suitable information, or any combination thereof.

FIG. 3 is a diagram 300 of a further illustrative parsed text corpus 306, in accordance with some implementations of the present disclosure. Sentence 306, as shown below:

Strohmeyer received his degree from the University of Göttingen in 1800.

is an "alma mater" example relation (similar to FIG. 2) between "Strohmeyer" and "University of Göttingen." Row 310 shows the respective parts of speech of text corpus 306, such as NOUN, VERB, determiner (DET), number (NUM), preposition (ADP), and pronoun (PRON). Row 308 shows illustrative tags, using a first illustrative tag set, for respective parts of speech of text corpus 306, such as preposition (IN), proper noun (NNP), noun (NN), past tense verb (VBD), determiner (DT), cardinal number (CD), and possessive pronoun (PRP$). Row 304 shows illustrative tags, using a second illustrative tag set, for respective semantic role labels of text corpus 306, such as preposition (prep), determiner (det), verb (ROOT), possessive pronoun (poss), punctuation (p), compound modifier (nc), nominal subject (nsubj), direct object of a verb (dobj), and object of a preposition (pobj). Note that for this example, an EAV application may use a co-reference resolution tool, as discussed below in the context of FIG. 6, to associate "his" with "Strohmeyer." Illustrative text pattern 302 is representative of the portion of the tree path corresponding to the "alma mater" attribute.

The dashed boxes of FIGS. 2-3 illustrate the identified root, entity, and value associated with the root, all of which may be identified, for example, using an entity resolution tool. The dashed arrows in FIGS. 2-3 illustrate respective illustrative parse tree paths from the ROOT to the subject and object of the verb. A parse tree path may be extracted from the parsed text of FIG. 2-3 using module 102 of FIG. 1, and stored as at least part of parse tree data 120, applied to the parsed text of FIGS. 2-3 using module 104 of FIG. 1 and parse tree data 120, or both.

Figure 4:
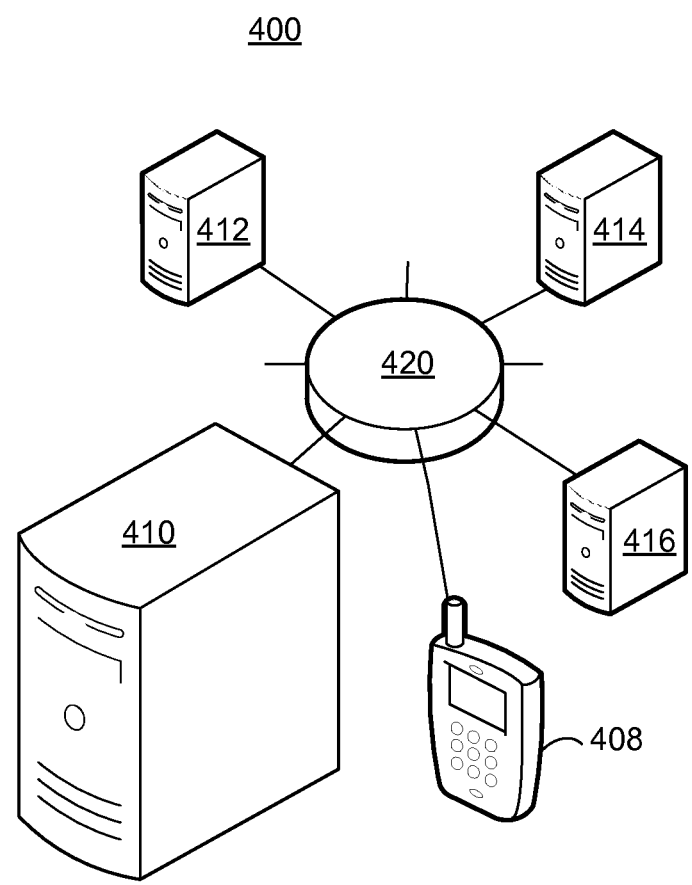
FIG. 4 is a block diagram of an illustrative arrangement for implementing an entity-attribute-value (EAV) application.

FIG. 4 is a block diagram of an illustrative arrangement for implementing an EAV application, in accordance with some implementations of the present disclosure. The illustrative system 400, as shown in FIG. 4, may include a server 410, having processing equipment, a network 420 communicatively coupling the server 410 to one or more web servers 412, one or more databases 414, and one or more remote processing devices 416, and any other suitable systems, devices, or networks that are not shown in FIG. 4. It will be understood that databases 414 are illustrative, and that any suitable device having suitable memory hardware configured to store data according to a data structure representation may be used in accordance with the present disclosure.

In some implementations, server 410 may include processing equipment, memory, one or more communications interfaces, one or more user interfaces, any other suitable components, or any combination thereof. In some implementations, server 410 may include one or more system buses including control buses, data buses, and or address buses, which may be configured to allow communication between a processor, memory, internal devices, external devices, any other suitable devices and networks, or any combination thereof. In some implementations, server 410 may include one or more communication interfaces, configured to transmit and/or receive information with other systems, devices, and/or networks.

In some implementations, the one or more web servers 412, one or more databases 414, and one or more remote processing devices 416 may each include memory storage configured to store web documents, media items, any other suitable information, or any combination thereof. In some implementations, server 410 may be communicatively coupled to any or all of one or more web servers 412, one or more databases 414, and one or more remote processing devices 416, any other suitable device, or any combination thereof, via network 420. In some implementations, network 420 may include several network scales such as, for example, a local area network (LAN), a wide area network (WAN), or other network, which may be wired, wireless, optical, or any combination thereof. For example, server 410 and one or more web servers 412, one or more databases 414, and one or more remote processing devices 416 may communicate using an internet protocol, e.g., transmission control protocol and internet protocol TCP/IP. In some implementations, server 410 may be configured to pull information from one or more of one or more web servers 412, one or more databases 414, and one or more remote processing devices 416. In some implementations, one or more of one or more web servers 412, one or more databases 414, and one or more remote processing devices 416 may be configured to push information to server 410. In some implementations, server 410 may be configured as a client, and one or more of one or more web servers 412, one or more databases 414, and one or more remote processing devices 416 may be configured as a host. Server 410 and one or more web servers 412, one or more databases 414, and one or more remote processing devices 416 may use any suitable communications protocol such as, for example, Ethernet, e.g., IEEE 802 protocols such as IEEE 802.11 wireless LAN, TCP/IP, any other suitable protocol, or any combination thereof to receive, transmit, or otherwise exchange information.

In some implementations, server 410 may be configured to communicate with client device 408, which may be configured to receive user input, provide output to a user, process information, or any combination thereof. Accordingly, in some implementations, client device 408 may include a user interface such as a display screen, a touchscreen, a keyboard, a mouse, an audio output device such as a speaker, an audio input device such as a microphone, a processor, transmitting equipment, any other suitable hardware or software interface, or any combination thereof. For example, client device 408 may include a smartphone, which may include a keypad, a display screen, a communications interface such as a wireless transmitter and receiver, a speaker, a microphone, memory hardware, and a processor. In some implementations, one or more client devices may be coupled to one or more web servers 412, one or more databases 414, or one or more remote processing devices 416. For example, one or more remote processing devices 416 may include a personal computer coupled to a keyboard and mouse, and a remote user may input a text corpus or request a search for EAVs to be performed by server 410. An EAV application can be implemented by any device, or combination of devices of system 400.

Figure 5:
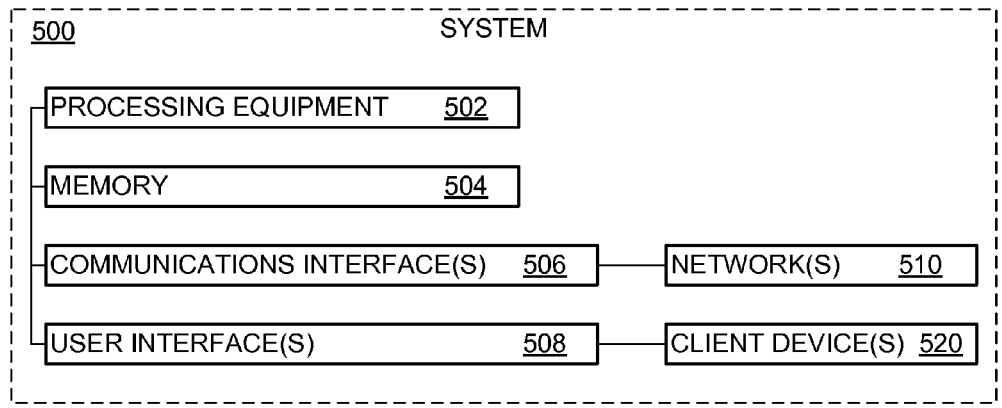
FIG. 5 is a block diagram of an illustrative system configured to implement an EAV application.

FIG. 5 is a block diagram of an illustrative system 500 configured to implement an EAV application, in accordance with some implementations of the present disclosure. System 500 may include processing equipment 502, memory 504, communications interface(s) 506, network(s) 510, user interface(s) 508, client device(s) 520, any other suitable components not shown in FIG. 5, or any combination thereof. In some implementations, system 500 may be included fully or partially in any or all of server 410, one or more web servers 412, one or more databases 414, and one or more remote processing devices 416 of FIG. 4. For example, processing equipment 502 may be included in a particular server, and a portion of memory 504 may be included in a remote server relative to the particular server.

In some implementations, processing equipment 502 may include a processor, e.g., a central processing unit, cache, memory, e.g., any suitable volatile and/or non-volatile memory, one or more communication buses, e.g., any suitable serial and/or parallel bus, any other suitable components, or any combination thereof. In some implementations, memory 504 may include any suitable volatile or non-volatile memory, which may be configured to store one or more data structure representations, processing algorithms, text corpuses, any other suitable information, or any combination thereof, which may be local or remote relative to processing equipment 502. For example, memory 504 may include random access memory (RAM), read-only memory (ROM), flash memory, magnetic memory storage devices such as hard disks, or a combination thereof. In some implementations, communications interface(s) 506 may include any suitable connectors, receivers, transmitters, modules such as a Universal Serial Bus connectable WiFi adapter card, or any combination thereof. Communications interface(s) 506 may include suitable components to communicatively couple to network 510. In some implementations, user interface(s) 508 may couple to client devices 520, which may include a display screen, a touchscreen, a keyboard, a mouse, an audio output device such as a speaker, an audio input device such as a microphone, any other suitable hardware or software, or any combination thereof such as a smart phone, tablet computer, or other suitable device. Using processing equipment 502, system 500 may be configured to execute software commands stored in suitable memory, e.g., memory 504. In some implementations, all or some of system 500 may be implemented in a client device such as, for example, a smart phone. For example, processing equipment of a client device may be configured to implement an EAV application.

Figure 6:
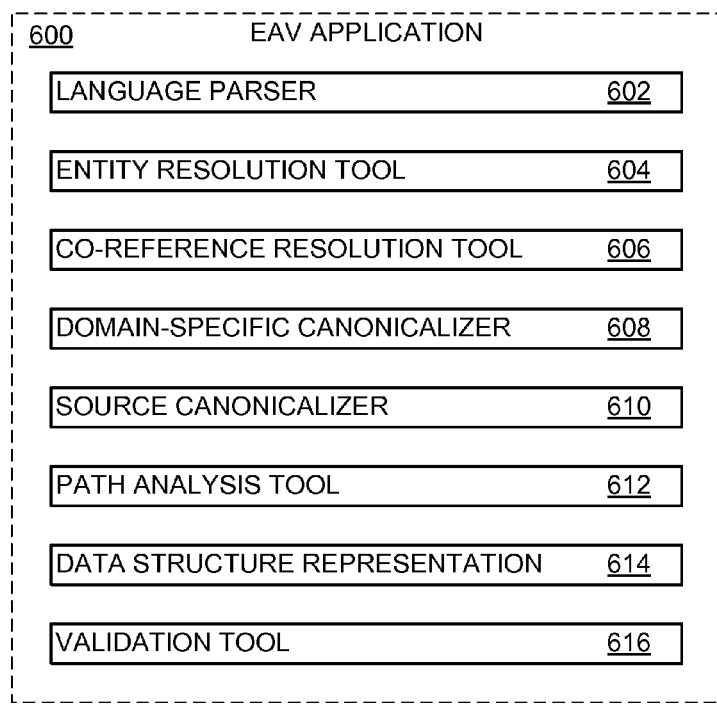
FIG. 6 is a block diagram of an illustrative EAV application having multiple modules.

FIG. 6 is a block diagram of an illustrative EAV application 600 having multiple modules, in accordance with some implementations of the present disclosure. EAV application 600 may include a language parser 602, entity resolution tool 604, a co-reference resolution tool 606, a domain-specific canonicalizer 608, a source canonicalizer 610, a path analysis tool 612, one or more data structure representations 614, validation tool 616, any other suitable application tools, or any combination thereof, which may be implemented in hardware, software, or both. It will be understood that, although shown illustratively as having multiple modules, an EAV application may be configured as a single module, a single set of computer program instructions readable by suitable processing equipment, any other suitable configuration, or any combination thereof. In some implementations, one or more application tools of EAV application 600 may be combined with other tools, omitted, or otherwise altered in accordance with the present disclosure. Any suitable combination of tools may be implemented in EAV application 600. For example, in some implementations, entity resolution tool 604 may be included as part of language parser 602, co-reference resolution tool 606, or both. In some implementations, any tool of EAV application 600 may be triggered, or otherwise selectively used, based on a desired fact type, text source, the presence of one or more keywords in a text corpus, any other suitable criterion, or any combination thereof. The tools of EAV application 600 may aid the extraction of facts by improving efficiency, accuracy, or both.

In some implementations, the EAV application may use language parser 602 to parse a text corpus. Language parser 602 may take as input any suitable natural language text, and may assign part-of-speech tags to the words of the text corpus. Language parser 602 may also arrange the tags into a tree structure whose edges may, for example, be annotated with functional labels. The disclosed techniques are applicable to phrase structure parses, logical form parses, any other suitable tree-based formalism for representing natural language, or any combination thereof.

Figure 7:
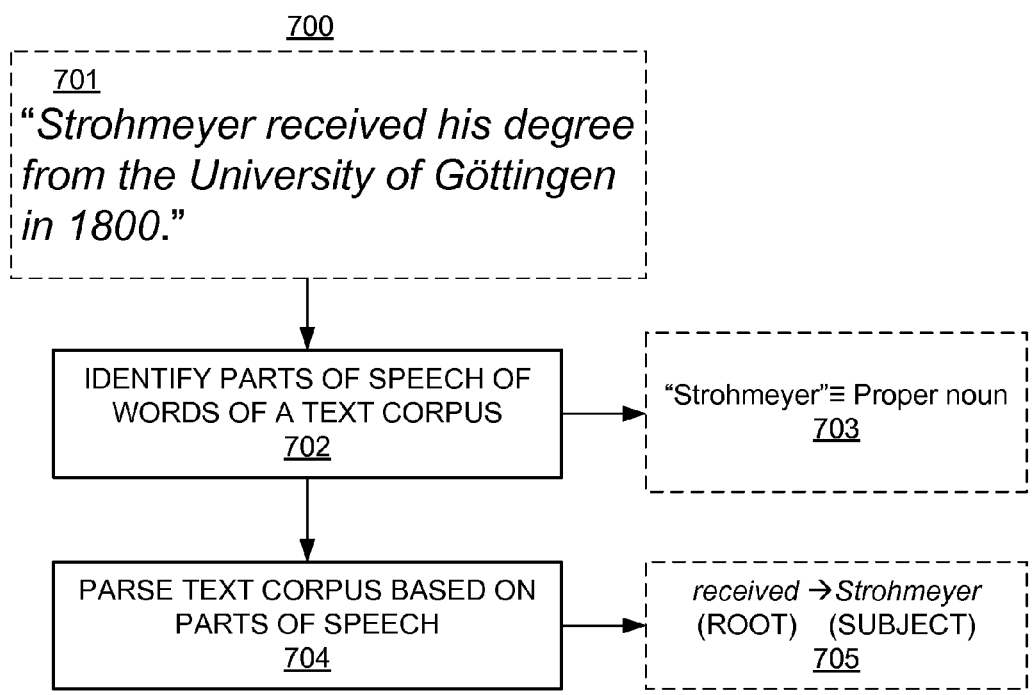
FIG. 7 is a flow diagram of illustrative steps for parsing a parsed text corpus.

FIG. 7 is a flow diagram 700 of illustrative steps for parsing a parsed text corpus, in accordance with some implementations of the present disclosure. For example, language parser 602 may take as input text corpus 701, shown below:

Strohmeyer received his degree from the University of Göttingen in 1800.

At step 702, language parser 602 may identify parts of speech of each of the words of text corpus 601. For example, language parser 602 may determine that "Strohmeyer" is a proper noun, as shown by output 703. At step 704, language parser 602 may parse text corpus 701 based at least in part on the identified parts of speech from step 702. In some implementations, language parser 602 may parse text corpus 601 into a parse tree structure. For example, language parser 602 may determine that the verb "received" is a root and that proper noun "Strohmeyer" is a subject of the root, as shown by the parse tree portion in output 705. In some implementations, language parser 602 may use one or more language tags or other predetermined tags to identify the parts of speech of text corpus 701. In some implementations, each term in a sentence may be represented by a node. Each node may include the identity of the word, the word's part of speech, the node's parent node, a semantic role label indicating how the node relates to the parent node, a child node, a semantic role label indicating how the node relates to the child node, any other suitable information, or any combination thereof.

In some implementations, rather than rely on a syntactic parse of the text, EAV application 600 of FIG. 6 may use an alternate implementation such as a flat sentence string. Using a flat-string approach, EAV application 600 may identify linear expressions, which are typically specific strings of words arranged in a specific order regardless of parts of speech or semantics, rather than parse tree paths. Under some circumstances, the flat-string approach is more susceptible to variations in natural language such as, for example, variation in word order, extra adjectives, adverbs, clauses, or other variations from an expected linear expression.

In some implementations, EAV application 600 may use a relatively more general parse tree path. For example, the path may include parts of intermediate nodes, such as the stem of a word rather than the full word. Some portions of a text corpus could be left as unspecified, e.g., tagged with "unspecified" part-of-speech tags. In a further example, one or more additional terms in a sentence, beyond the path from entity to value, could form part of the path. In some implementations, a path may resemble regular text expressions, defining node sequences of varying length.

In some implementations, EAV application 600 of FIG. 6 may include entity resolution tool 604. In some implementations, entity resolution tool 604 may search a text corpus, and recognize a text string corresponding to a particular entity, value, or both. EAV application 600 may use entity resolution tool 604 to find relevant portions of a text corpus directed to a desired entity, value, or both. For example, referencing text corpus 701, entity resolution tool 604 may identify this sentence from a larger text corpus as being relevant to the entity "Strohmeyer."

In some implementations, the EAV application 600 of FIG. 6 may use a co-reference resolution tool 606. Co-reference resolution tool 606 may take as input any suitable natural language text, e.g., pre-processed by language parser 602, and may identify one or more phrases in the text which refer to the same real-world entity.

Figure 8:
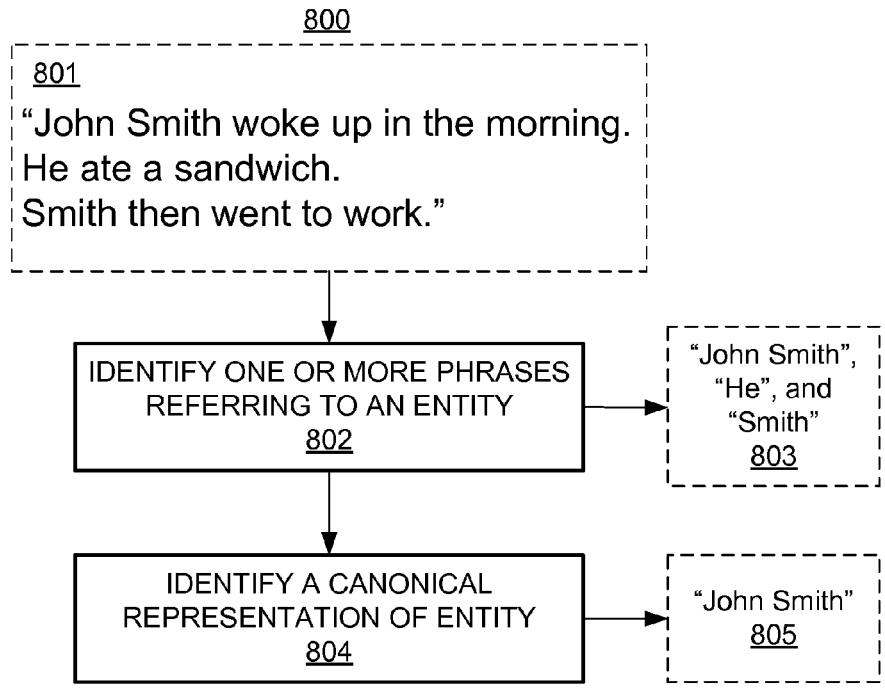
FIG. 8 is a flow diagram of illustrative steps for identifying references to the same entity in a parsed text corpus.

FIG. 8 is a flow diagram 800 of illustrative steps for identifying references to the same entity in a parsed text corpus, in accordance with some implementations of the present disclosure. For example, co-reference resolution tool 606 may take as input text corpus 801, shown below:

John Smith woke up in the morning. He ate a sandwich. Smith then went to work.

At step 802, co-reference resolution tool 606 may identify one or more phrases that refer to the same entity. For example, co-reference resolution tool 606 may determine that "John Smith," "He," and "Smith" all refer to the same real-world entity, the person John Smith as used in this illustrative example, as shown by output 803. In some implementations, co-reference resolution tool 606 may also indicate which of the three expressions is the most canonical representation of the entity, as shown by step 804. In this illustrative example, co-reference resolution tool 606 may determine that "John Smith" 805 may be the most canonical representation of the person John Smith.

In some implementations, EAV application 600 of FIG. 6 may use a domain-specific canonicalizer 608. The domain-specific canonicalizer 608 may be configured to recognize types of strings in particular domains and provide a canonical representation under which strings may be recognized as equivalent. Illustrative domains may include, for example, dates, measurements, units of measure, or any other suitable domains. In some implementations, domain-specific canonicalizer 608 may enable EAV application 600 to more accurately identify EAVs by recognizing different strings as being equivalent.

Figure 9:
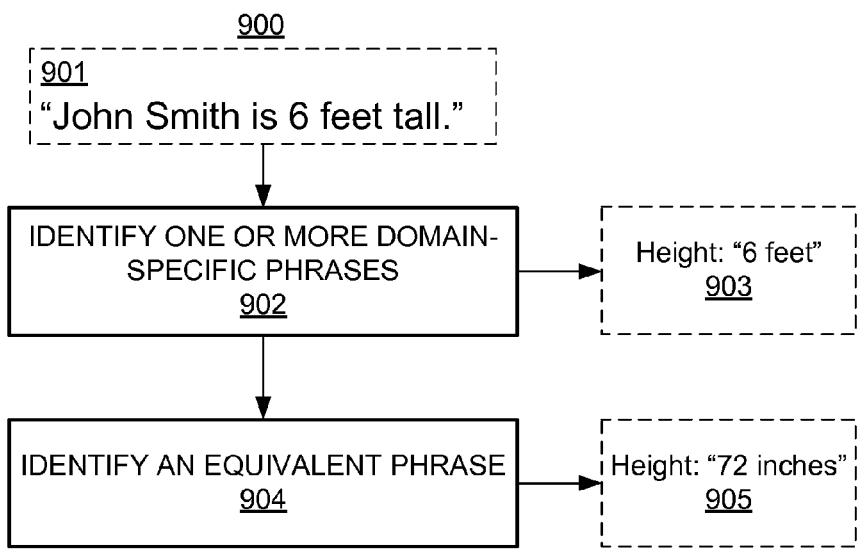
FIG. 9 is a flow diagram of illustrative steps for canonicalizing portions of a parsed text corpus.

FIG. 9 is a flow diagram 900 of illustrative steps for canonicalizing portions of a parsed text corpus, in accordance with some implementations of the present disclosure. For example, domain-specific canonicalizer 608 may take as input passage 901, shown below:

John Smith is 6 feet tall.

At step 902, domain-specific canonicalizer 608 may identify one or more domain-specific phrases. For example, the phrase "6 feet" of passage 901 may be identified as a height based on the word "tall," as shown by output 903. At step 904, domain-specific canonicalizer 608 may identify an equivalent phrase to the one or more phrases of step 902. For example, domain-specific canonicalizer 608 may identify "6 feet" as being equivalent to the phrase "72 inches." The identifications of step 902 and 904 may be used to determine whether two or more phrases within a particular text corpus are equivalent, to determine what phrases of other text corpuses may be equivalent to an identified phrase, or both. For example, EAV application 600 may, using domain-specific canonicalizer 608, analyze the text corpus:

John Smith is 6 feet tall. 72 inches is a normal height.

and may extract the fact that "John Smith" is of normal height.

In some implementations, EAV application 600 of FIG. 6 may include source canonicalizer 610. In some implementations, source canonicalizer 610 may flag a tree path as corresponding to one or more particular sources of text. In some implementations, source canonicalizer 610 may identify entities, values, or other text based at least in part on the source of the text corpus. For example, a first source, e.g., a first website yyy.com, may include the text corpus "John Smith is 6 feet tall" while a second source, e.g., a second website zzz.com, may include the text corpus "John Smith has a height of 6 feet." Regarding the "entity-height" relationship, source canonicalizer 610 may use different parse tree paths for each source to represent the relationship and different words. For example, source canonicalizer 610 may use a parse tree path from the root "is" to the subject and the object for the first source, and a parse tree path from the root "has" to the subject, the direct object and the object of the preposition for the second source. The use of source canonicalizer 610 may be especially desired when a particular source includes text corpuses having particular patterns of text, grammar, or phrasing.

In some implementations, EAV application 600 of FIG. 6 may include path analysis tool 612. In some implementations, path analysis tool 612 may identify one or more paths between an entity and a value within a text corpus (e.g., such as a minimal path). In some implementations, path analysis tool 612 may be included as part of language parser 602. For example, language parser 602 may be configured to parse a text corpus, and identify one or more parse tree paths. In some implementations, path analysis tool 612 may identify and store one or more paths in data structure representation 614.

In some implementations, EAV application 600 of FIG. 6 may include data structure representation 614, which may be stored in any suitable memory, or combination thereof across one or more devices. Data structure representation 614 may include stored EAV examples, parse tree paths, text corpuses, any other suitable information, or any combination thereof. In some implementations, some or all of data structure representation 614 may be separate from EAV application 600. For example, EAV application 600 may access a separate, remote data structure representation to access stored text corpuses.

In some implementations, EAV application 600 of FIG. 6 may include validation tool 616. In some implementations, validation tool 616 may validate or invalidate parse tree paths, entity-value pairs, facts, sources, any other extracted information or sources thereof, or any combination thereof. In an illustrative example, validation tool 616 may analyze multiple entity-value pairs extracted using a particular parse tree path to determine whether the path is associated with a particular attribute. In a further illustrative example, validation tool 616 may evaluate, and validate, whether a particular path provides relatively consistent results for various entities, values, sources, attributes, any other suitable text or sources thereof, or any combination thereof.

It will be understood that EAV application 600 may be implemented using any suitable tools illustrated in FIG. 6, any other tools, or any combination thereof. For example, EAV application 600 may include language parser 602, entity resolution tool 604, and co-reference resolution tool 606. Further to this example, in some implementations, EAV application 600 may be configured to always use language parser 602 and entity resolution tool 604, and only use co-reference resolution tool 606 when a pronoun is identified by language parser 602. In a further example, EAV application 600 may include all of the tools shown in FIG. 6. Further to this example, EAV application 600 may always use language parser 602, entity resolution tool 604, co-reference resolution tool 606, and domain-specific canonicalizer 608. However, EAV application 600 may be configured to only use source canonicalizer 610 if more than one text source is analyzed. In a further example, the EAV application 600 may be configured to include language parser 602 and validation tool 616, and may be configured to access data structure representation 614 to retrieve example-EAV data and parse tree path data, and store extracted facts.

Figure 10:
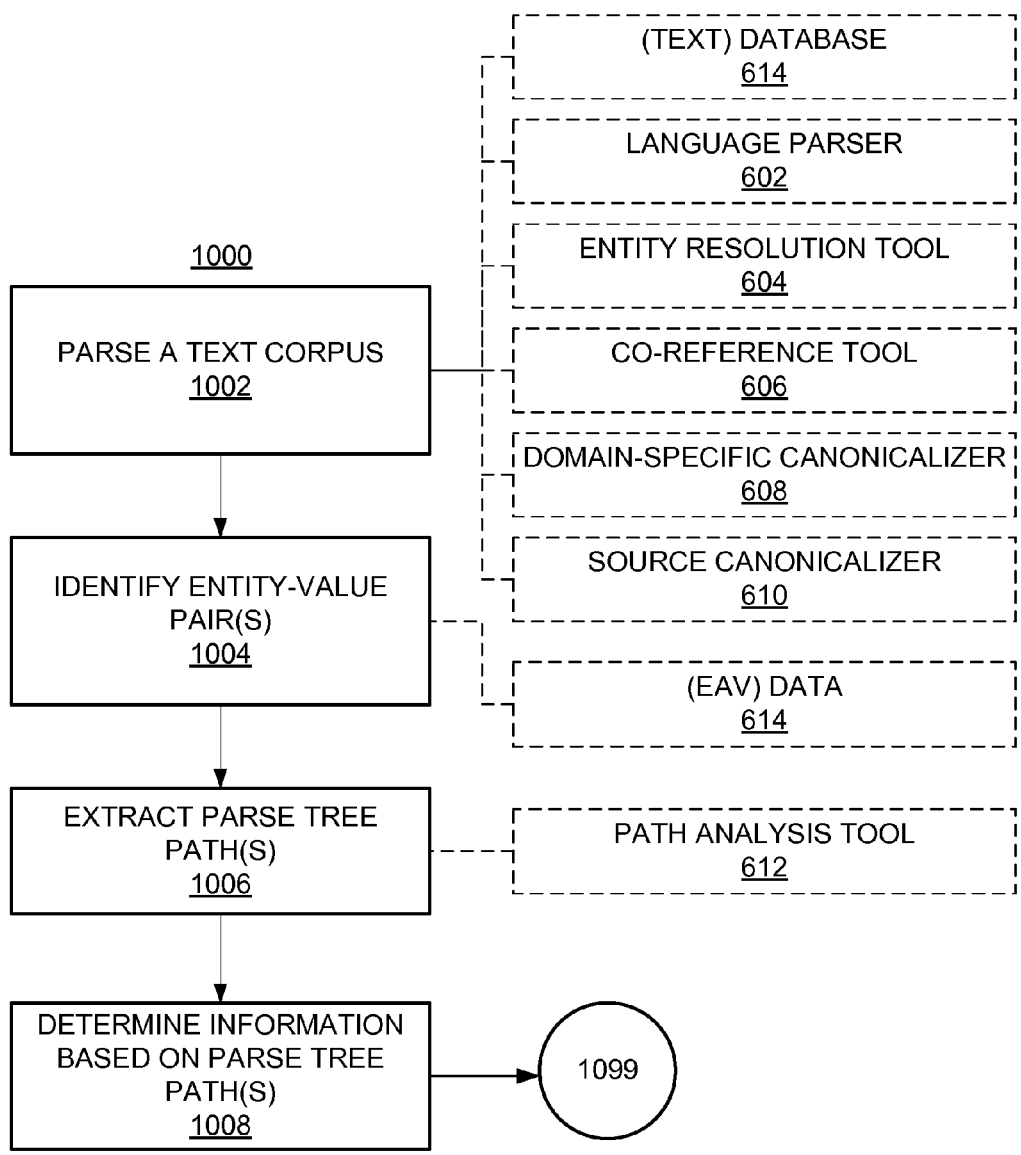
FIG. 10 is a flow diagram of illustrative steps for determining information from a parsed text corpus.

FIG. 10 is a flow diagram 1000 of illustrative steps for determining information from a parsed text corpus, in accordance with some implementations of the present disclosure. In some implementations, the EAV application may analyze one or more sentences, or phrases, in a text corpus based on example-EAV data, e.g., stored according to data structure representation 614. An example-EAV is considered a known fact. The EAV application may parse and analyze a text corpus containing the entity and value in light of the known fact, to determine one or more parse tree paths with the text corpus that correspond to the known fact. Accordingly, the EAV application may map one or more parse tree paths to the known fact. The mapped parse tree paths may, for example, be stored and used to extract additional facts for different entities, values, or both from text sources.

Step 1002 may include the EAV application parsing a text corpus using language parser 602. The EAV application may use language parser 602, entity resolution tool 604, co-reference resolution tool 606, domain-specific canonicalizer 608, source canonicalizer 610, any other suitable tools, or any combination thereof, to parse the text corpus.

Step 1004 may include the EAV application identifying one or more entity-value pairs in the parsed text corpus of step 1002. In some implementations, the EAV application may determine if a sentence or phrase contains both the entity and the value of any fact in the example-EAV data. In some implementations, using co-reference resolution tool 606, strings mentioned directly in the sentence may be considered as well as their identified antecedents. In some implementations, using domain-specific canonicalizer 608, phrases mentioned directly in the sentence may be considered as well as their identified equivalents. In some implementations, instead of using explicit example-EAVs, EAV application 600 may specify the types of strings which make valid entities or values. For example, if "person's zodiac sign" facts were to be extracted, the EAV application need not access a data structure representation of example-EAVs, and instead may specify that one or more capitalized words, e.g., intended to indicate a name, is a valid entity, and that any of the strings "Aquarius", "Pisces", "Taurus", "Leo", etc. are valid values.

Step 1006 may include the EAV application extracting one or more parse tree paths for one or more of the identified entity-value pairs of step of 1004. If the EAV application identifies an entity-value pair, the EAV application may then extract the minimal path through the parse tree linking the entity to the value using path analysis tool 612. The extracted path may include intermediate words, their parts of speech, any edge labels connecting the intermediate words, the entity, the value, any other suitable information, or any combination thereof.

Step 1008 may include the EAV application determining information based on the one or more extracted parse tree paths of step 1006. In some implementations, the EAV application may output the entity, attribute, value, path, any other suitable information, or any combination thereof as a single data record. In some implementations, where the text corpus includes documents from separate, identifiable sources such as URL hosts, these sources may also be included as part of the data record.

Figure 11:
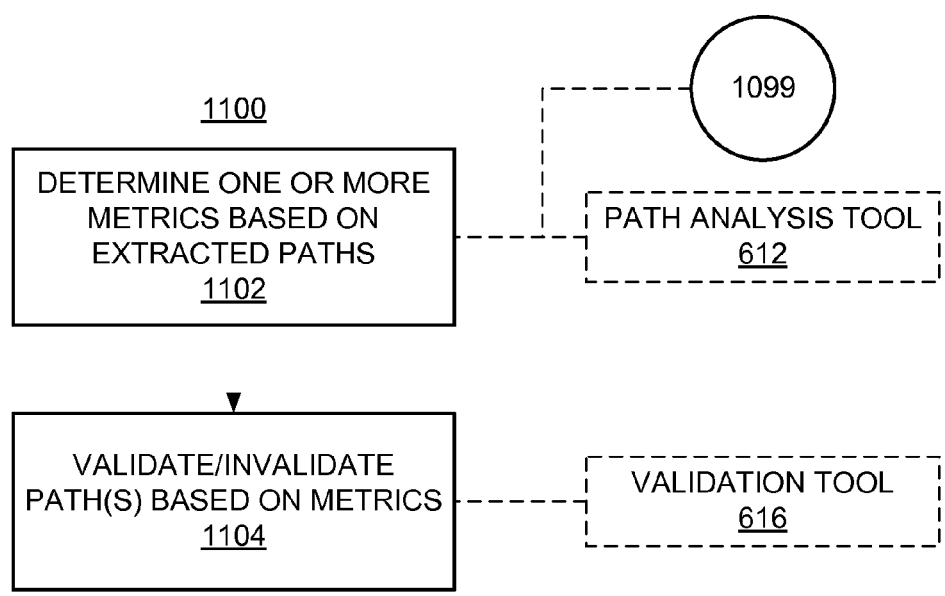
FIG. 11 is a flow diagram of illustrative steps for validating a parse tree path.

FIG. 11 is a flow diagram 1100 of illustrative steps for validating a parse tree path, in accordance with some implementations of the present disclosure.

Step 1102 may include the EAV application determining one or more metrics based on extracted paths using the illustrative steps of flow diagram 1000 as shown by marker 1099. In some implementations, the paths may have been extracted using a large set of example facts having different attributes. The EAV application may group the paths or corresponding data records by path and calculate one or more metrics based on the grouped paths. For example, the EAV application may determine for one or more groups of paths how many paths are in the group, the number of different attributes associated with the group, the number of different sources associated with the group, the number of different facts associated with the group, the number of different entities associated with the group, the number of different values associated with the group, any other suitable metric, or any combination thereof.

The paths in each group may have been extracted based on one or more example facts. In some implementations, a grouped path may be used to extract new entity-value pairs based on the example facts used to extract the grouped path. For example, the entity or value of an example fact may be used with the grouped path to identify new entity-value pairs. The EAV application may determine metrics based on the new entity-value pairs, including how many new entity-value pairs are identified, how many sources correspond to the new entity-value pairs, how many new entity-value pairs are consistent with the example fact, any other suitable metric, or any combination thereof.

It will be understood that the metrics may be determined based on the grouped paths, any suitable subset of the groups, or any suitable combination thereof. Suitable subsets include, for example, subsets based on source, attribute, example fact, example fact entity, example fact value, any other suitable subset, or any combination thereof.

Step 1104 may include the EAV application validating or invalidating one or more extracted paths based on the one or more determined metrics of step 1102. For example, a threshold may be applied for the number of unique attributes, sources, entities, and values present in the set of data records for a given path with a given attribute. In some implementations, one or more cross-attribute statistical metrics may be analyzed. For example, the EAV application may require that, in order to be validated, at least some percentage of all data records for a given path contain the same attribute. In some implementations, paths may be partially or fully validated or invalidated. For example, a given path may be validated for one group of sources and invalidated for a different group of sources. In some implementations, a path may be validated by aggregating over the number of unique facts with the same attribute identified using the path. In some implementations, the validation may be based on what other attributes the path extracts facts for and with what frequency the other attributes are extracted. For example, a path for which the attribute "school" is extracted 50% of the time and the attribute "parent" is extracted 50% of the time may be invalidated because it is likely not a sufficiently good path for either attribute.

In an illustrative example of the foregoing, the EAV application may use a particular parse tree path to extract facts for a particular entity from one or more text corpuses. If the particular parse tree path yields the same fact for different texts, then the EAV application may validate the particular parse tree path. For example, if the particular parse tree path yields a particular fact, having a corresponding attribute, 70% of the time or any other suitable threshold, then the EAV application may validate the particular parse tree path, may associate the corresponding attribute to the path, or both. In some implementations, the EAV application may validate a path when a substantially one-to-one relationship is determined to exist between the path and a particular attribute. For example, if a particular path yields a set of facts, and those facts arise primarily from that path (as opposed to other paths), then the EAV application may validate the path and corresponding attribute.

Figure 12:
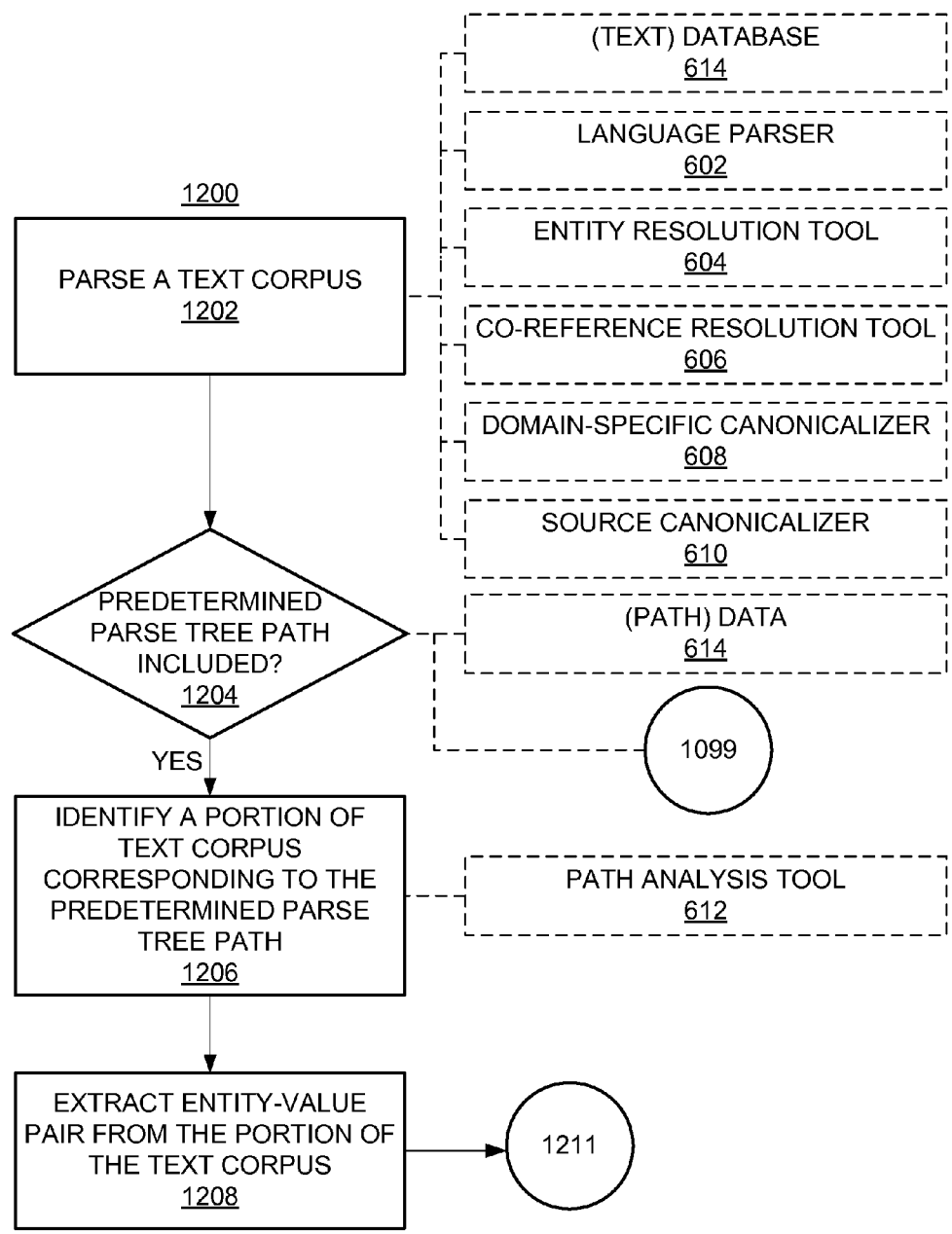
FIG. 12 is a flow diagram of illustrative steps for extracting entity-value pairs from a parsed text corpus.

In some implementations, the EAV application may use an extracted or otherwise predetermined parse tree path to extract further facts. FIG. 12 is a flow diagram 1200 of illustrative steps for extracting entity-value pairs from a parsed text corpus, in accordance with some implementations of the present disclosure. In some implementations, for example, the illustrative steps flow diagram 1200 may be performed after one or more parse tree paths are extracted and validated using the respective techniques of flow diagram 1000 of FIG. 10 and flow diagram 1100 of FIG. 11. The illustrative techniques of flow diagram 1200 may be applied to the same text corpus referred to in flow diagram 1000, or a different text corpus.

Step 1202 may include the EAV application parsing a text corpus using language parser 604. The EAV application may use language parser 602, entity resolution tool 604, co-reference resolution tool 606, domain-specific canonicalizer 608, source canonicalizer 610, any other suitable tools, or any combination thereof, to parse the text corpus.

Step 1204 may include the EAV application determining whether a predetermined parse tree path is included in the parsed text corpus. The EAV application may scan the text corpus for an occurrence of a predetermined parse tree path, e.g., extracted using the illustrative techniques of flow diagram 1000. If the EAV application determines that one or more predetermined paths are present, then the EAV application may identify the portion of the text corpus corresponding to the predetermined parse tree path, as shown by step 1206. The identified portion of the text corpus may span the entity and the value.

Step 1208 may include the EAV application extracting one or more entity-value pairs from the identified portion of the text corpus of step 1206. In some implementations, a new EAV may be determined for each entity and value identified as being related to the path. In some implementations, co-reference resolution tool 606 may be used to determine EAVs for the antecedents of the entity and value.

In an illustrative example of the techniques of flow diagram 1200, consider the example sentences of FIGS. 2-3. The EAV application may use tree paths associated with the "alma mater" attribute to recognize the paths in sentences such as:

Larry Page had attended Stanford and

George Bush received his degree, which was in history, from Yale.

Accordingly, the EAV application may identify new "alma mater" relations between "Larry Page" and "Stanford," and between "George Bush" and "Yale." Note that in both of these new examples, the sentences vary slightly from those of FIGS. 2-3, respectively, with extra modifiers and clauses. Because the EAV application suitably parses the sentence rather than using the raw string, the sentences appear structurally the same as the respective sentences of FIGS. 2-3.

In some implementations, the EAV application may use one or more features to aid in mapping a parse tree path to a parsed text corpus. In some implementations, in addition to the path from entity to value, one or more additional terms in the text corpus may be required to be present. For example, terms which are immediately adjacent to terms along the path in the parse tree may be required. In some implementations, the features need not be nodes in the parse tree. For example, a feature may include an indication of the type of the entity or the value, e.g., a value may be required to be a person, a color, a distance, or some other type. In some implementations, where features are used, the EAV application may be configured to not over-specify the expected syntactic structure, which would likely result in missed facts. For example, only those features which are deemed relatively important by the EAV application may be required in addition to the basic parse tree path. In some implementations, the EAV application may determine the importance of one or more features by determining how frequently the features occur in instances in free text of the example paths. For example, the EAV application may determine that in a significant majority of instances where an example EAV was extracted from a path "X<-son<-Y" (the arrows indicating head-child relationships in the parse tree), the entity X has a child node of "'s", indicating possession, e.g., "X's son, Y." Accordingly, this feature may be required by the EAV application, so that EAVs will only be extracted from the "X<-son<-Y" path if the entity "X" has a child term of "'s."

Figure 13:
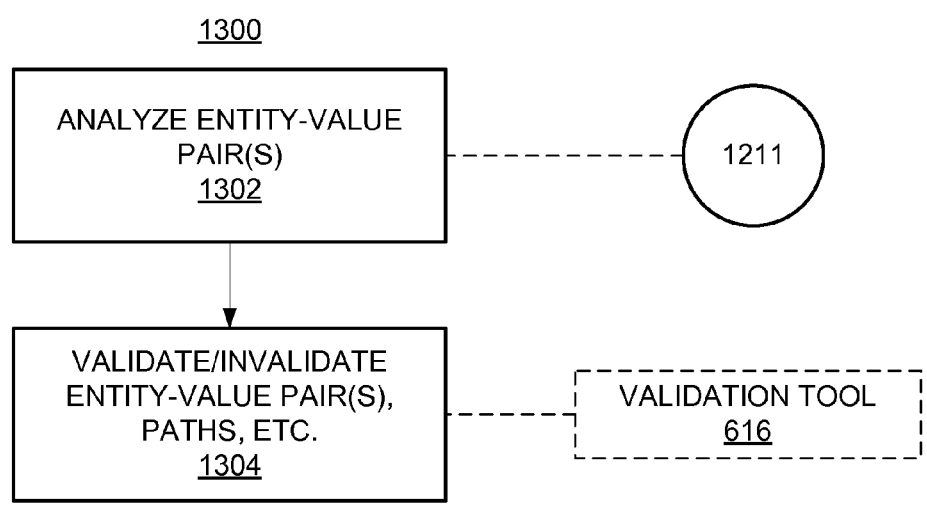
FIG. 13 is a flow diagram of illustrative steps for validating a fact.

FIG. 13 is a flow diagram 1300 of illustrative steps for validating facts, paths, attributes, or a combination thereof, in accordance with some implementations of the present disclosure.

Step 1302 may include the EAV application analyzing one or more entity-value pairs, e.g., extracted using the illustrative techniques of flow diagram 1200 as shown by marker 1211. In some circumstances, where a relation being extracted is such that an entity is likely to only have one value, the EAV application may compare the set of new EAVs extracted for each path with an original set of example-EAVs. In some implementations, for each extracted EAV, the EAV application may determine whether either of the following holds: (a) the same EAV appears in the set of example facts; or (b) there is another example fact with the same entity and same attribute, but a value distinct from new extracted value. For example, a path, fact, or both can be scored and filtered by examining the ratio of (a) facts to (b) facts. The more (b) facts per (a) fact, the less likely the path is indicative of the attribute and/or the less likely the fact is correct. For example, a path that is too general may provide multiple facts that are not necessarily associated with the desired attribute. Accordingly a path, fact, attribute, or a combination thereof, and the corresponding entity-value pair may be validated or invalidated at step 1304 using the analysis of step 1302. Step 1304 may use the EAV application for performing the validation based at least in part on the analysis of step 1302. Whereas the path-filtering techniques described in the context of flow diagram 1100 may primarily examine occurrences of example-EAVs, the techniques of flow diagram 1300 may examine occurrences of other EAVs, and may aid in eliminating paths which are too general or give undesired results. For example, a particular predetermined path corresponding to the "country-capital" attribute may be used to identify both of the following sentences:

Washington D.C. is in the USA. New York is in the USA. based on the root-preposition "is-in" and the presence of suitable proper nouns, e.g., city and country names. The particular parse tree path may be considered too general, and accordingly invalidated, due to the occurrence of the type (b) fact of the second sentence.

In some implementations, the entity-value pairs may have been extracted using one or more predetermined paths. The EAV application may calculate one or more metrics based on the extracted entity-value pairs. In some implementations, the EAV application may determine for one or more paths how many instances of an entity-value pair are extracted, how many instances of an entity-value pair are extracted relative to a total number facts, how many instances of different entity-value pairs are extracted for a given entity, how many sources from which a particular entity-value pair may be extracted, any other suitable metric, or any combination thereof. For example, if a particular entity-value pair is extracted from only one source, and is not extracted from any other source, the EAV application may, in some circumstances, invalidate that entity-value pair. In a further example, if the EAV application extracts multiple different entity-value pairs for the same entity using a particular path, the EAV application may invalidate the multiple entity-value pairs.

The foregoing is merely illustrative of the principles of this disclosure and various modifications may be made by those skilled in the art without departing from the scope of this disclosure. The above described implementations are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method for automatically identifying entity-value pairs from text, the method comprising the following operations performed by at least one processor:
   receiving an electronic text file including a text corpus comprising a plurality of words;
   generating, by parsing the text corpus, a corresponding parse tree structure in memory, including nodes of each of the plurality of words having edges based on the parts of speech of the plurality of words;
   identifying a plurality of entity-value pairs in the text corpus that correspond to a predetermined entity and a predetermined value related to the predetermined entity by a predetermined attribute, wherein each of the entity-value pairs comprise an entity and a value;
   extracting based on the parse tree structure, a plurality of parse tree paths to traverse the tree structure from a node corresponding the entity to a node corresponding to the value of the plurality of entity-value pairs;
   generating a data record including an indication of how accurately the extracted plurality of parse tree paths correspond to the predetermined attribute, based on at least one of the plurality of parse tree paths; and
   validating an entity-value pair based on the data record.

2. The method of claim 1, wherein identifying the plurality of entity-value pairs comprises identifying one or more phrases of the text corpus that correspond to the predetermined entity.

3. The method of claim 2, wherein the one or more phrases comprise a plurality of phrases, the method further comprising selecting, by the at least one-processor, one phrase from the plurality of phrases that provides a canonical representation of the entity.

4. The method of claim 1, further comprising recognizing, by the at least one processor, a portion of the text corpus as being equivalent to a text string based on a canonical representation of the portion of the text corpus.

5. The method of claim 1, wherein the plurality of parse tree paths are minimal paths through the parse tree structure that link the respective entities and the corresponding values in the plurality of entity-value pairs.

6. The method of claim 1, wherein the data record further comprises statistical information related to how well at least one of the plurality of parse tree paths maps to the predetermined attribute.

7. The method of claim 1, further comprising identifying, by the at least one processor, a plurality of values in the text corpus corresponding to the predetermined entity and a particular parse tree path of the plurality of parse tree paths, wherein the data record further comprises information associated with how many unique values exist in the plurality of values.

8. The method of claim 1, further comprising identifying, by the at least one processor, a plurality of entities in the text corpus corresponding to the predetermined value and a particular parse tree path of the plurality of parse tree paths, wherein the data record further comprises information associated with a number of unique entities in the plurality of entities.

9. The method of claim 1, wherein the text corpus is from a plurality of sources and wherein the data record further comprises a number of sources from which a given parse tree path of the plurality of parse tree paths was extracted.

10. The method of claim 1, further comprising the following operation performed by the at least one processor:
    extracting a second plurality of parse tree paths corresponding to a second plurality of entity-value pairs associated with multiple attributes; and
    identifying a common parse tree path in the plurality of parse tree paths and the second plurality of parse tree paths,
    wherein the data record further comprises information associated with a percentage of entity-value pairs corresponding to the common parse tree path that have a given attribute.

11. A system for automatically identifying entity-value pairs from text, the system comprising:
    a storage device that stores a set of instructions; and
    at least one processor that executes the set of instructions to:
      receive an electronic text file including a text corpus comprising a plurality of words;
      generate by parsing the text corpus, a corresponding parse tree structure in memory, including nodes of each of the plurality of words having edges based on the parts of speech of the plurality of words;
      identify a plurality of entity-value pairs in the text corpus that correspond to a predetermined entity and a predetermined value related to the predetermined entity by a predetermined attribute, wherein each of the entity-value pairs comprise an entity and a value;
      extract, based on the parse tree structure, a plurality of parse tree paths to traverse the tree structure from a node corresponding the entity to a node corresponding to the value of the plurality of entity-value pairs;
      generate a data record including an indication of how accurately the extracted plurality of parse tree paths correspond to the predetermined attribute, based on at least one of the plurality of parse tree paths; and
      validating an entity-value pair based on the data record.

12. The system of claim 11, wherein the at least one processor further executes the instructions to identify one or more phrases of the text corpus that correspond to the predetermined entity.

13. The system of claim 12, wherein the one or more phrases comprise a plurality of phrases, and wherein the at least one processor further executes the instructions to select one phrase from the plurality of phrases that provides a canonical representation of the entity.

14. The system of claim 11, wherein the at least one processor further executes the instructions to recognize a portion of the text corpus as being equivalent to a text string based on a canonical representation of the portion of the text corpus.

15. The system of claim 11, wherein the plurality of parse tree paths are minimal paths through the parse tree structure that link the respective entities and the corresponding values in the plurality of entity-value pairs.

16. The system of claim 11, wherein the at least one processor further executes the instructions to determine statistical information related to how well at least one of the plurality of parse tree paths maps to the predetermined attribute.

17. The system of claim 11, wherein the at least one processor further executes the instructions to:
   identify a plurality of values in the text corpus corresponding to the predetermined entity and a particular parse tree path of the plurality of parse tree paths; and
   wherein the data record further includes information indicating how many unique values exist in the plurality of values.

18. The system of claim 11, wherein the at least one processor further executes the instructions to:
   identify a plurality of entities in the text corpus corresponding to the predetermined value and a particular parse tree path of the plurality of parse tree paths; and
   wherein the data record further includes information indicating a number of unique entities in the plurality of entities.

19. The system of claim 11, wherein the text corpus is from a plurality of sources and wherein the at least one processor further executes the instructions to determine a number of sources from which a given parse tree path of the plurality of parse tree paths was extracted.

20. The system of claim 11, wherein the at least one processor further executes the instructions to:
   extract a second plurality of parse tree paths corresponding to a second plurality of entity-value pairs associated with multiple attributes; and
   identify a common parse tree path in the plurality of parse tree paths and the second plurality of parse tree paths; and
   wherein the data record further includes information indicating a percentage of entity-value pairs corresponding to the common parse tree path that have a given attribute.

21. A computer-implemented method for automatically identifying entity-value pairs from text, the method comprising the following operations performed by at least one processor:
   receiving an electronic text file including a text corpus comprising a plurality of words;
   generating, by parsing the text corpus, a corresponding parse tree structure in memory, including nodes of each of the plurality of words having edges based on the parts of speech of the plurality of words;
   determining whether the parse tree structure includes a predetermined parse tree path corresponding to an attribute, the predetermined parse tree path traversing the parse tree structure from a node corresponding an entity to a node corresponding to a value of an entity-value pairs;
   identifying a portion of the text corpus corresponding to the predetermined parse tree path when the parse tree structure includes the predetermined parse tree path;
   extracting an entity-value pair from the portion of the text corpus, wherein the entity-value pair comprises an entity and a value corresponding to the entity, and wherein the entity-value pair corresponds to an entity-attribute-value relationship; and
   validating the entity-value pair.

22. The method of claim 21, wherein validating the entity-value pair comprises:
   comparing the entity and the corresponding value to one or more reference entities and corresponding values; and
   determining whether the attribute corresponding to the predetermined parse tree path is indicative of an attribute associated with the extracted entity-value pair based on the comparison.

23. The method of claim 21, further comprising extracting, by the at least one processor, a plurality of entity-value pairs from the text corpus, wherein validating the entity-value pair comprises analyzing the plurality of entity-value pairs to determine how many values correspond to the value in the entity-value pair.

24. The method of claim 21, wherein validating the entity-value pair comprises comparing the entity-value to one or more entity and value text patterns.

25. The method of claim 21, further comprising invalidating, by the at least one processor, the predetermined parse tree path based on the validation of the entity-value pair.

26. The method of claim 21, wherein the predetermined parse tree path comprises an intermediate node corresponding to a portion of a word in the text corpus.

27. The method of claim 21, further comprising identifying, by the at least one processor, one or more characteristics of the text corpus prior to identifying the portion of the text corpus.

28. A system for automatically identifying entity-value pairs from text, the system comprising:
   a storage device that stores a set of instructions; and
   at least one processor that executes the set of instructions to:
      receive an electronic text file including a text corpus comprising a plurality of words;
      generating, with a processor, by parsing the text corpus, a corresponding parse tree structure in memory, including nodes of each of the plurality of words having edges based on the parts of speech of the plurality of words;
      determine whether the parse tree structure includes a predetermined parse tree path corresponding to an attribute, the predetermined parse tree path traversing the parse tree structure from a node corresponding an entity to a node corresponding to a value of an entity-value pairs;
      identify a portion of the text corpus corresponding to the predetermined parse tree path when the parse tree structure includes the predetermined parse tree path;
      extract an entity-value pair from the portion of the text corpus, wherein the entity-value pair comprises an entity and a value corresponding to the entity, and wherein the entity-value pair corresponds to an entity-attribute-value relationship; and
      validating the entity-value pair.

29. The system of claim 28, wherein the at least one processor further executes the instructions to:
   compare the entity-value pair to one or more reference entities and corresponding values related to the one or more reference entities by corresponding reference attributes.

30. The system of claim 28, wherein the at least one processor further executes the instructions to:
   extract a plurality of entity-value pairs from the text corpus; and
   analyze the plurality of entity-value pairs to determine how many values correspond to the value in the entity-value pair.

31. The system of claim 28, wherein the at least one processor further executes the instructions to compare the entity-value to one or more entity and value text patterns.

32. The system of claim 28, wherein the at least one processor further executes the instructions to invalidate the predetermined parse tree path based on the validation of the entity-value pair.

33. The system of claim 28, wherein the predetermined parse tree path comprises an intermediate node corresponding to a portion of a word in the text corpus.

34. The system of claim 28, wherein the at least one processor further executes the instructions to identify one or more characteristics of the text corpus prior to identifying the portion of the text corpus.

35. The system of claim 28, further comprising memory configured to store a plurality of parse tree paths, wherein the plurality of parse tree paths comprise the predetermined parse tree path.

* * * * *